United States Patent [19]
Statler

[11] 3,889,937
[45] June 17, 1975

[54] FRICTION-TYPE SHOCK ABSORBER

[76] Inventor: Lowell E. Statler, Box 115, Bellevue, Ohio 44811

[22] Filed: Jan. 16, 1974

[21] Appl. No.: 433,870

[52] U.S. Cl. .................................. 267/9 C; 267/96
[51] Int. Cl. ............................................. F16f 11/0
[58] Field of Search ..................... 267/9 B, 9 C, 9 R

[56] References Cited
UNITED STATES PATENTS

| | | | |
|---|---|---|---|
| 1,713,515 | 5/1929 | Bechereau | 267/9 C |
| 2,615,535 | 10/1952 | Snyder | 267/9 C |
| 2,752,149 | 6/1956 | Farcellini | 267/9 C |
| 3,059,916 | 10/1962 | Fahlbusch et al. | 267/9 C |

*Primary Examiner*—James B. Marbert
*Attorney, Agent, or Firm*—Donnelly, Maky, Renner & Otto

[57] ABSTRACT

Telescoped inner and outer tubes have friction material in compression therebetween and secured to one of such tubes. Relative axial movement of the tubes dissipates energy by moving the friction force developed between the friction material and the other tube. The friction material has an extremely low coefficient of friction so the breakaway force required to overcome static friction is not significantly greater than the force required to continue movement under kinetic friction. A coil spring extends through the tubes and is secured to the outer ends thereof for selectively acting in tension or compression to aid in absorbing energy. The spring is tensioned when the shock absorber assembly is installed for reducing the external force required to overcome static friction in one direction of relative movement between the tubes.

15 Claims, 2 Drawing Figures

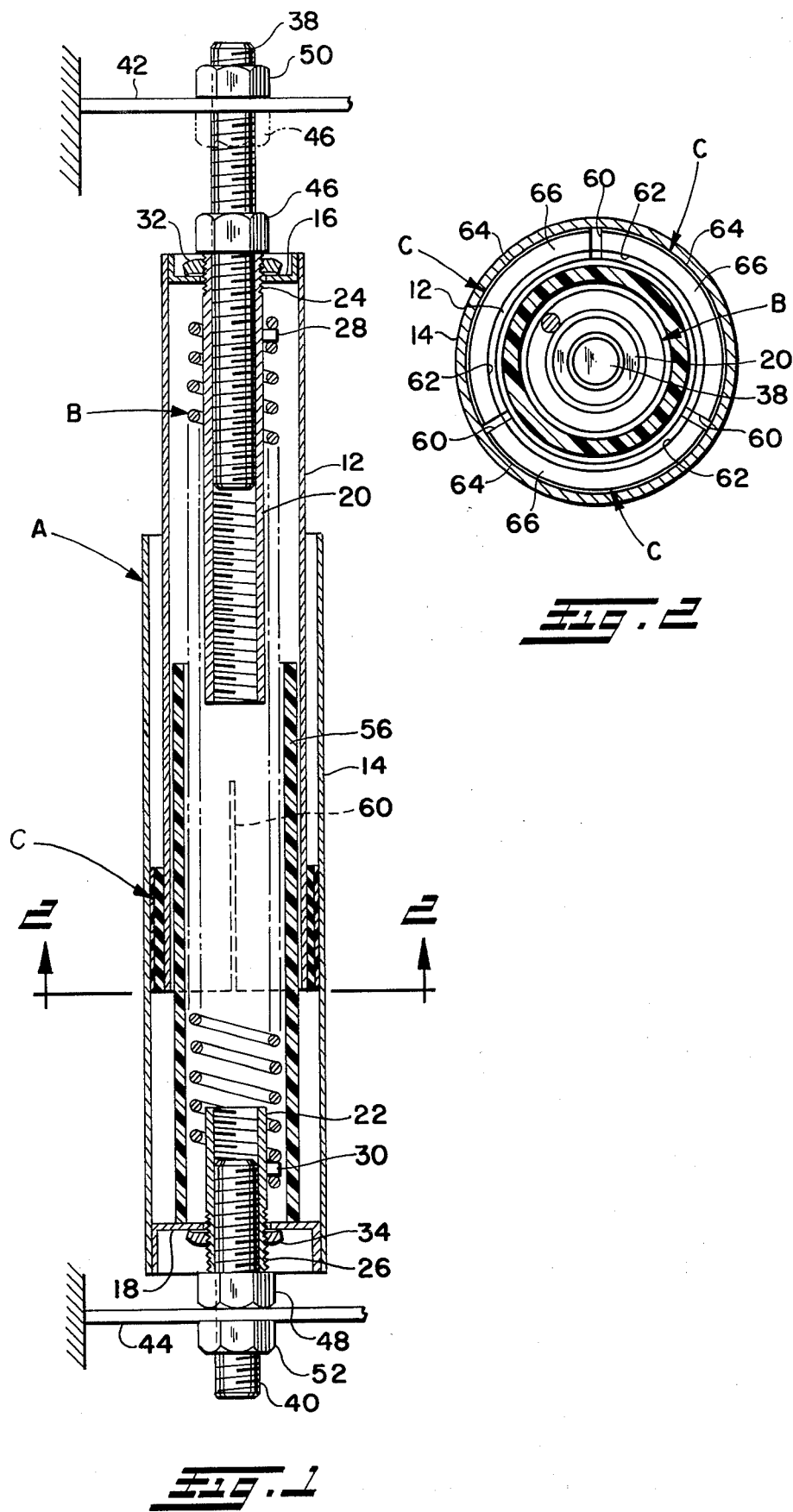

FRICTION-TYPE SHOCK ABSORBER

BACKGROUND OF THE INVENTION

This application pertains to the art of shock absorbers, and more particularly to friction-type of shock absorbers.

Friction-type of shock absorbers commonly exhibit non-uniform performance characteristics because the applied force required to overcome static friction for initiating movement is substantially greater than the force required to overcome kinetic friction and continue movement. One reason for such undesirable characteristic is the significant difference in static and kinetic coefficients of friction for the friction materials employed in such shock absorbers. Loud and undesirable screaching noises are often produced during operation of such shock absorbers. The performance characteristics of such shock absorbers is often significantly different depending upon whether the absorber assembly is dry or wet.

SUMMARY OF THE INVENTION

A friction-type of shock absorber assembly includes telescoped inner and outer tubes having friction material compressed therebetween and secured to one of such tubes. Relative axial movement between the tubes causes the friction force between the friction material and the other tube to move for dissipating and absorbing energy. The friction material has an extremely low coefficient of friction so the kinetic coefficient of friction is insignificantly smaller than the static coefficient of friction. With such an arrangement, the external force required to overcome static friction and initiate movement is not significantly greater than the external force required to overcome kinetic friction and continue movement. The extremely low coefficient of friction of the friction material substantially eliminates screaching noises.

A helical spring extends through the tubes and is secured to the outer ends thereof for aiding in operation of the absorber assembly by acting in compression or tension depending upon the direction in which relative movement between the tubes occurs. The spring is preferably tensioned when the assembly is installed in order to reduce the external force required to overcome static friction for initiating movement of the tubes.

BRIEF DESCRIPTION OF THE DRAWING

FIG. 1 is a cross-sectional elevational view of a shock absorber assembly constructed in accordance with the present invention; and FIG. 2 is a cross-sectional view looking generally in the direction of arrows 2—2 of FIG. 1.

DESCRIPTION OF A PREFERRED EMBODIMENT

FIG. 1 shows shock absorber assembly A including telescoped inner and outer cylindrical tubes 12 and 14 having end caps 16 and 18 welded or otherwise suitably secured to the outer ends thereof.

Pipes 20 and 22 have internally and externally threaded end portions 24 and 26 extending through suitable centrally located holes in end caps 16 and 18. Pipes 20 and 22 have small radially extending lugs 28 and 30 welded to the exterior surface thereof for threading between coils of an elongated helically coiled spring B having axially spaced-apart adjacent coils in the relaxed condition thereof to be capable of exerting both compression and tension forces. Instead of threading lugs 28 and 30 between adjacent coils of spring B for securing the end portions thereof to pipes 20 and 22, it is obvious that the opposite end portions of such spring could be secured to such pipes by welding, clamping, or in any other suitable manner.

Lock nuts 32 and 34 are externally threaded on end portion 24 and 26 of pipes 20 and 22, and firmly tightened against end caps 16 and 18 for securing such pipes against axial movement relative to the respective end cap through which it extends. Externally threaded mounting screws 38 and 40 are threaded into end portions 24 and 26 of pipes 20 and 22 for mounting assembly A to brackets as at 42 and 44 respectively secured to the body and wheel assembly of an automobile or the like. Lock nuts 46 and 48 are threaded on screws 38 and 40 for locking such screws against movement relative to pipes 20 and 22. Securing nuts 50 and 52 are threaded onto screws 38 and 40 for mounting assembly A to brackets 42 and 44.

Pipe 22 is substantially shorter than pipe 20 for allowing movement of such pipes and their related tubes toward one another. A cylindrical sleeve member 56 is positioned within tube 14 around spring B and pipe 22 for guiding spring B and pipe 20 in a substantially straight axial path and preventing sideways bending of such spring during compression thereof. Instead of having a guide sleeve as at 56, it is obvious that the inner end portions of pipes 20 and 22 could be of different diameters so that one would telescope inside of the other for performing a guiding function.

Friction material C is radially compressed between inner and outer tubes 12 and 14, and is secured to one of such tubes. In accordance with one arrangement, the inner end portion of inner tube 12 is longitudinally split at a plurality of circumferentially-spaced locations as shown at 60 in FIG. 2. The longitudinal extent of such slits 60 will depend upon the bending force required, as well as the overall dimensions of assembly A and the longitudinal extent of friction material C. Such longitudinal slits 60 provide the inner end portion of inner tube 12 with a plurality of circumferentially-spaced arcuate resilient fingers 62 which are deformable generally radially inward and outward relative to the longitudinal axis of tube 12.

Friction material C comprises arcuate strips or pads 64 of a preferable friction material adhesively bonded or otherwise secured to solid rubber pads 66 which are in turn bonded or otherwise secured to the outer surfaces of finger 62.

In accordance with an important aspect of the invention, friction material strips 64 are formed from a material having an extremely low coefficient of friction. A preferred material is fluorocarbon resin, and particularly polytetrafluoroethylene or polyfluorinated ehtylene proplyene resin. Such materials exhibit a coefficient of friction relative to the smooth interior of a steel or aluminum tube 14 of around 0.02. The difference between the static and kinetic coefficient of friction for such a material having such a low coefficient of friction is a matter of hundredths or even thousandths so that for most practical purposes the coefficients of static and kinetic friction may be considered to be substantially uniform. In addition, the difference between the dry and wet coefficient of friction is also a matter of hundredths or thousandths so that such material may be considered as having a substantially uniform static, kinetic, dry and wet coefficient of friction.

Friction material strips 64 are adhesively bonded to solid rubber pads 66 having a hardness of around 50–80 durometer on the Shore A scale. Pads 66 aid in having strips 64 under substantially uniform radial compression throughout their area and also absorb vibrations for damping noise. Strips 64 may be adhesively bonded to pads 66 with any suitable adhesive such as epoxy, resorcinol, or phenol-resorcinol thermosetting adhesive. Pads 66 are bonded to fingers 62 with any suitable adhesive such as thermosetting or an elastomeric adhesive.

The radial thickness of pads 66 and friction material strips 64 is greater than the difference between the external diameter of tube 12 and the internal diameter of tube 14. The amount by which such thickness is greater will depend upon the desired normal force between friction material strips 64 and the internal surface of tube 14. Radially inward clamping pressure is supplied against friction material strips 64 as by a hose clamp or suitable jig positioned toward end cap 16 from the inner end of tube 12 for bending fingers 62 generally radially inward so that the exterior surfaces of friction material strips 64 lie on the periphery of a cylinder having a diameter less than the inner diameter of tube 14. This makes it possible to slide tube 12 with the friction material thereon a short distance into the inner end of tube 14. The clamp or jig may then be removed and axial force applied for telexcoping tubes 12 and 14 to properly locate friction material C completely within tube 14.

In assemblying the shock absorber, end caps 16 and 18 are first secured to the outer ends of tubes 12 and 14. Pipes 20 and 22 are then secured to the opposite end portions of spring B, and screws 38 and 40 are threaded into such pipes. Sleeve 56 is then positioned around spring B and this assembly is positioned in tube 14 as shown with end portion 26 of pipe 22 extending through the suitable central opening in end cap 18. Tube 12 is next positioned over the spring and screw 38. Fingers 62 are bent generally radially inward as previously described so that friction material C will fit within tube 14. Axial movement of tube 12 into tube 14 will then allow pipe end portion 24 to extend through the suitable opening in end cap 16. External lock nuts 32 and 34 are then applied to pipe end portions 24 and 26. Adjustment screw 40 is rotated relative to pipe 22 for obtaining a proper extension length and lock nut 48 is then applied thereto. Adjustment screw 38 is also rotated relative to pipe 24 in order to obtain a proper extension thereof for mounting purposes and lock nut 46 is then applied. Adjustment screws 38 and 50 are positioned through suitable holes in mounting brackets 42 and 44. Securing nut 52 is then applied to screw 40 so that bracket 44 is securely clamped between nuts 48 and 52. The adjustment of screw 38 is such that the upper surface of nut 46 will now be approximately 1 inch from the undersurface of mounting bracket 42. Securing nut 50 is then tightened for drawing nut 46 toward mounting bracket 42 until bracket 42 is securely clamped between nuts 46 and 50. This operation will cause tube 12 to move away from tube 14 and will extend spring B so that it will be under a tension of around eighty pounds. That is, in the installed position of assembly A, there is around an 80 pound force tending to telescope tubes 12 and 14 toward one another. The amount of this initial force will depend upon the size of assembly A and the purpose to which it will be put. This initial tensioning of spring B reduces the external force required to overcome static friction between friction material C and the internal surface of tube 14 for movement of such tubes toward one another. Obviously, the assembly can be installed with spring B compressed for reducing the external force required to initiate movement of tubes 12 and 14 away from one another.

When assembly A is installed as described, the initial tensioning of spring B reduces the breakaway force upon upward movements of the wheel assembly to which mounting bracket 44 is attached. On downward rebound of the wheel assembly, the breakaway force is greater to provide better snubbing action because there is less spring tension. For large bumps, the wheel assembly will move upwardly a sufficient distance for completely overcoming the initial tension in spring B so that spring B will act in compression. Therefore, large bumps are resisted by friction plus increasing compression of spring B, while rebound is first resisted by friction minus decreasing compression of spring B and then by friction plus increasing tension of spring B.

The bending stress imparted to fingers 62 during initial assembly of the device is such that the normal force between friction material C and tube 14 creates friction producing a substantially greater resistance to movement in either direction than that provided by compression or tightening of spring B.

Instead of having separate strips 64 of the described friction material secured to pads 66, it will be recognized that it is possible to use fiber flock of such friction material as a filler in other synthetic plastic or elastomeric material for eliminating separate friction strips and elastomeric pads. Such a composite material has sufficient fiber flock of the desired friction material to impart an extremely low coefficient of surface friction to the composite material. In a preferred arrangement, the coefficient of friction for friction material C is not greater than approximately 0.05. However, it will be recognized that certain aspects of the invention, such as initial tensioning of the spring for reducing the necessary breakaway force can be used with friction material having a higher coefficient of friction, and particularly for assemblies where uniform performance characteristics are not necessary.

Although the invention has been shown and described with respect to a preferred embodiment, it is obvious that equivalent alterations and modifications will occur to others skilled in the art upon the reading and understanding of this specification. The present invention includes all of such equivalent alterations and modifications, and is limited only by the scope of the claims.

The embodiments of the invention in which an exclusive property or privilege is claimed are defined as follows:

1. A shock absorber assembly including telescoped inner and outer tubes movable axially relative to one another, friction material secured to one of said tubes in compression between said tubes for resisting such relative axial movement of said tubes, said friction material having a substantially uniform static and kinetic coefficient of friction.

2. The assembly of claim 1 and further including elastomeric material interposed between said friction material and said one tube.

3. The assembly of claim 1 wherein said tubes have outer ends and including a coil spring extending through said tubes and being secured to said outer ends.

4. The assembly of claim 3 and including axially adjustable mounting means on at least one of said outer ends for mounting said assembly with said spring under predetermined tension.

5. The assembly of claim 1 wherein said friction material is secured to said inner tube.

6. The assembly of claim 5 wherein the inner end of said inner tube is longitudinally split to provide a plurality of resilient fingers and said friction material comprises individual friction material strips secured to each of said fingers.

7. The assembly of claim 6 and including elastomeric material interposed between each said finger and strip.

8. A shock absorber assembly including telescoped inner and outer tubes movable axially relative to one another in opposite directions and having outer ends, friction material secured to one of said tubes in compression between said tubes for resisting such relative axial movement of said tubes, spring means attached to said outer ends and extending through said tubes for selectively acting in compression or tension to resist axial movement of said tubes in said opposite directions, said spring means being stressed when said assembly is installed for reducing the axial force required to overcome the breakaway friction force between said friction material and the other of said tubes for relative movement of said tubes in one of said directions.

9. The assembly of claim 8 wherein said spring means is stressed in tension for reducing the axial force required to overcome the breakaway force between said friction material and the other of said tubes for relative movement of said tubes toward one another.

10. The assembly of claim 8 wherein said friction material is secured to said inner tube.

11. The assembly of claim 10 wherein said inner tube has an inner end portion which is longitudinally split to provide a plurality of resilient fingers each having an individual strip of said friction material thereon and being under bending stress for maintaining said friction material in compression between said fingers and said outer tube.

12. The assembly of claim 11 and including elastomeric material interposed between said fingers and said friction material.

13. The assembly of claim 8 wherein said friction material has a substantially uniform static and kinetic coefficient of friction.

14. The assembly of claim 13 and including elastomeric material interposed between said friction material and said one tube.

15. The assembly of claim 8 wherein said friction material has a surface coefficient of friction not greater than approximately 0.05.

* * * * *